(12) United States Patent
Francois et al.

(10) Patent No.: US 11,952,485 B2
(45) Date of Patent: Apr. 9, 2024

(54) (METH)ACRYLIC COMPOSITION, COMPOSITE MATERIAL OBTAINED FROM SUCH A COMPOSITION, METHOD FOR PRODUCING SAME AND USES THEREOF

(71) Applicant: Arkema France, Colombes (FR)

(72) Inventors: Gilles Francois, Charly (FR); Guillaume Cledat, Marcq en Baroeul (FR)

(73) Assignee: ARKEMA FRANCE, Colombes (FR)

( * ) Notice: Subject to any disclaimer, the term of this patent is extended or adjusted under 35 U.S.C. 154(b) by 645 days.

(21) Appl. No.: 17/254,957

(22) PCT Filed: Jun. 27, 2019

(86) PCT No.: PCT/FR2019/051585
§ 371 (c)(1),
(2) Date: Dec. 22, 2020

(87) PCT Pub. No.: WO2020/002842
PCT Pub. Date: Jan. 2, 2020

(65) Prior Publication Data
US 2021/0122910 A1    Apr. 29, 2021

(30) Foreign Application Priority Data
Jun. 28, 2018   (FR) ..................................... 18.55887

(51) Int. Cl.
*C08L 33/10* (2006.01)
*C08K 3/22* (2006.01)

(52) U.S. Cl.
CPC ...... *C08L 33/10* (2013.01); *C08K 2003/2227* (2013.01)

(58) Field of Classification Search
CPC ..................................................... C08L 33/10
See application file for complete search history.

(56) References Cited

U.S. PATENT DOCUMENTS

| | | |
|---|---|---|
| 10,280,271 B2 | 5/2019 | Gerard |
| 10,294,358 B2 | 5/2019 | Gerard et al. |
| 10,804,904 B1 | 10/2020 | Das et al. |
| 2016/0017106 A1 | 1/2016 | Gerard |
| 2016/0090434 A1 | 3/2016 | Gerard et al. |
| 2018/0127563 A1 | 5/2018 | Bugiolacchio et al. |
| 2019/0241728 A1* | 8/2019 | Gerard .................. C08F 265/06 |

FOREIGN PATENT DOCUMENTS

| | | |
|---|---|---|
| JP | 2005082612 A2 | 3/2005 |
| JP | 2005082612 A2 | 3/2005 |
| WO | WO 2013/017651 A1 | 2/2013 |

* cited by examiner

*Primary Examiner* — Jeffrey C Mullis
(74) *Attorney, Agent, or Firm* — BUCHANAN, INGERSOLL & ROONEY PC

(57) ABSTRACT

The invention relates to a (meth)acrylic composition comprising:

(a) 100 parts by weight of a liquid (meth)acrylic syrup comprising:
 (a1) from 10% by weight to 50% by weight of one or more (meth)acrylic polymers P1, and
 (a2) from 50% by weight to 90% by weight of one or more (meth)acrylic monomers M1 comprising only one (meth)acrylic function per monomer,
(b) from 20 parts by weight to 300 parts by weight of a mineral filler C,
(c) from 0.01 part by weight to 5 parts by weight of a (meth)acrylic monomer M2 comprising at least two (meth)acrylic functions per monomer,
(d) from 0.01 part by weight to 5 parts by weight of a (meth)acrylic monomer M3, the monomer M3 being:
 either a (meth)acrylic monomer $M3_1$ comprising only one (meth)acrylic function per monomer and being different from the monomer(s) M1,
 or a (meth)acrylic monomer $M3_2$ comprising at least two (meth)acrylic functions per monomer and being different from the monomer M2, and
(e) from 0.01 part by weight to 5 parts by weight of a polymerization initiator.

The invention also relates to a composite material obtained from this (meth)acrylic composition, to a process for manufacturing this composite material and to the uses of the (meth)acrylic composition and of the composite material.

22 Claims, No Drawings

(METH)ACRYLIC COMPOSITION, COMPOSITE MATERIAL OBTAINED FROM SUCH A COMPOSITION, METHOD FOR PRODUCING SAME AND USES THEREOF

This application claims benefit, under U.S.C. § 119 or § 365 of PCT Application Number PCT/FR2019/051585, filed Jun. 27, 2019, a this document being incorporated herein by reference.

TECHNICAL FIELD

The present invention relates to a (meth)acrylic composition and also to a composite material obtained by polymerization of such a (meth)acrylic composition, this material having particularly efficient mechanical properties.

The invention also relates to a manufacturing process and also to the uses of such a material which may be applied in many industrial sectors.

PRIOR ART

Composite materials based on (meth)acrylic resin have been described in a certain number of documents, among which are WO 2013/056845 A1, WO 2014/013028 A1 and WO 2014/135816 A1 in the name of the Applicant, these three documents being referenced [1], [2] and [3], respectively, in the rest of the present description.

Document [1] more particularly relates to a composite material comprising a thermoplastic (meth)acrylic matrix and a reinforcer formed by a fibrous material which may have various shapes and sizes and may be of natural or synthetic origin. The thermoplastic (meth)acrylic matrix may notably be obtained from a viscous liquid composition, referred to as a "liquid (meth)acrylic syrup", which comprises (meth)acrylic monomers, or mixtures of (meth)acrylic monomers, and oligomers or polymers dissolved in these monomers.

To improve the impregnation of the fibrous material with the thermoplastic (meth)acrylic matrix, document [2] proposes to use a liquid (meth)acrylic syrup which has a dynamic viscosity, at 25° C., within a range from 10 mPa·s to 1000 mPa·s. This liquid (meth)acrylic syrup comprises a (meth)acrylic polymer and a (meth)acrylic monomer.

Document [3] proposes an improvement of the (meth) acrylic compositions taught by documents [1] and [2] so as to obtain virtually complete polymerization while significantly reducing the content of residual (meth)acrylic monomers and so as to limit the shrinkage observed on conclusion of molding.

The (meth)acrylic composition taught by document [3] comprises a (meth)acrylic syrup comprising a (meth)acrylic polymer and a (meth)acrylic monomer, and also fillers chosen from particles with a degree of swelling in the (meth)acrylic monomer of less than 200%, the degree of swelling being defined as the capacity of a particle immersed in a compound to change in volume, and a mean diameter $D_{50}$ of less than 50 μm. These fillers are more particularly chosen from hollow glass beads and polymethyl methacrylate (PMMA) beads crosslinked with a crosslinking agent. The composite materials obtained by impregnating a fibrous material with such a (meth)acrylic composition have good mechanical properties and virtually no surface defects.

With regard to the constant concern for improving the properties of composite materials obtained from (meth) acrylic compositions, the Inventors set themselves the aim of providing a (meth)acrylic composition which can be used to produce a composite material that has good mechanical properties, without resorting to any impregnation of a fibrous material, as is the case for the materials described in documents [1] to [3]. This material must, in particular, conserve these good mechanical properties over time, in particular in the case where this material is exposed to light, inclement weather and/or working temperatures that may range up to 90° C.

Another aim of the present invention is to propose a process for manufacturing such a composite material, this process being easy to perform and making it possible to obtain the material in a limited number of steps with the equipment and tools of the industrial facilities currently used for the manufacture of composite materials.

DESCRIPTION OF THE INVENTION

These aims and yet others are achieved, firstly, by a (meth)acrylic composition of the abovementioned type, i.e. a composition comprising a liquid (meth)acrylic syrup and fillers.

According to the invention, this (meth)acrylic composition comprises:
(a) 100 parts by weight of a liquid (meth)acrylic syrup comprising:
($a_1$) from 10% by weight to 50% by weight of one or more (meth)acrylic polymers P1, and
($a_2$) from 50% by weight to 90% by weight of one or more (meth)acrylic monomers M1, each monomer M1 comprising only one (meth)acrylic function per monomer,
(b) from 20 parts by weight to 300 parts by weight of a mineral filler C,
(c) from 0.01 part by weight to 5 parts by weight of a (meth)acrylic monomer M2, the monomer M2 comprising at least two (meth)acrylic functions per monomer,
(d) from 0.01 part by weight to 5 parts by weight of a (meth)acrylic monomer M3, the monomer M3 being:
either a (meth)acrylic monomer $M3_1$ comprising only one (meth)acrylic function per monomer, the monomer $M3_1$ being different from the monomer(s) M1,
or a (meth)acrylic monomer $M3_2$ comprising at least two (meth)acrylic functions per monomer, the monomer $M3_2$ being different from the monomer M2,
(e) from 0.01 part by weight to 5 parts by weight of a polymerization initiator, and
(f) optionally, a coupling agent.

As shall be seen in the examples below, the composite material obtained after polymerization of a (meth)acrylic composition in accordance with the invention has particularly efficient mechanical properties, notably evaluated by measuring the tensile strength and the elastic modulus, evaluated according to the standard ISO 527-1:2012.

The (meth)acrylic composition according to the invention comprises, in specific weight proportions, a liquid (meth) acrylic syrup, a mineral filler C, (meth)acrylic monomers M2 and M3 and also a polymerization initiator.

More particularly, the liquid (meth)acrylic syrup comprises:
($a_1$) from 10% by weight to 50% by weight of one or more (meth)acrylic polymers P1, and
($a_2$) from 50% by weight to 90% by weight of one or more (meth)acrylic monomers M1.

The term "(meth)acrylic monomer" covers both an acrylic monomer and a methacrylic monomer. Similarly, the term "(meth)acrylic polymer" covers not only an acrylic homopolymer but also a methacrylic homopolymer, an acrylic copolymer and a methacrylic copolymer.

It is moreover pointed out that the expression "from . . . to . . . " which has just been mentioned and which is used in the present patent application should be understood as defining not only the values of the range, but also the values of the limits of that range.

The liquid (meth)acrylic syrup of the (meth)acrylic composition according to the invention may comprise only one (meth)acrylic polymer P1, but may equally comprise a mixture of two, three or even more (meth)acrylic polymers P1.

The or each (meth)acrylic polymer P1 included in the liquid (meth)acrylic syrup may in particular be chosen from:
   polyalkyl acrylates which comprise alkyl acrylate homopolymers and alkyl acrylate copolymers, and
   polyalkyl methacrylates which comprise alkyl methacrylate homopolymers and alkyl methacrylate copolymers.

According to a preferred embodiment, the or each (meth)acrylic polymer P1 is a polymethyl methacrylate (PMMA), it being understood that, as indicated above, the polymethyl methacrylate (PMMA) may denote a methyl methacrylate (MMA) homopolymer or an MMA copolymer.

In particular, in the case where the liquid (meth)acrylic syrup comprises a mixture of two or more polymethyl methacrylates P1, this mixture may be formed by mixing at least two MMA homopolymers having a different molecular weight, by mixing at least two MMA copolymers having an identical monomer composition and a different molecular weight, by mixing at least two MMA copolymers having a different monomer composition or by mixing at least one MMA homopolymer and at least one MMA copolymer.

According to one embodiment of the invention, methyl methacrylate represents at least 50% by weight of the or each (meth)acrylic polymer P1.

According to a particular embodiment, the or each (meth)acrylic polymer P1 comprises at least 70%, advantageously at least 80%, preferentially at least 90% and more preferentially at least 95% by weight of methyl methacrylate.

When the or each (meth)acrylic polymer P1 is a methyl methacrylate (MMA) copolymer, it may comprise at least one comonomer containing at least one ethylenic unsaturation and which is capable of copolymerizing with methyl methacrylate. Among these comonomers, mention may notably be made of acrylic and methacrylic acids and alkyl (meth)acrylates in which the alkyl group contains from 1 to 12 carbon atoms. As examples of comonomers, mention may be made of methyl acrylate and ethyl, butyl or 2-ethylhexyl (meth)acrylate.

Advantageously, the or each (meth)acrylic polymer P1 is a copolymer of methyl methacrylate and of alkyl acrylate in which the alkyl group contains from 1 to 12 carbon atoms, advantageously from 1 to 6 carbon atoms and preferentially from 1 to 4 carbon atoms.

According to a preferred embodiment, when the or each (meth)acrylic polymer P1 is a methyl methacrylate (MMA) copolymer, this methyl methacrylate (MMA) copolymer comprises from 70% to 99.9%, advantageously from 80% to 99.8%, preferentially from 90% to 99.8% and more preferentially from 90% to 99.7% by weight of methyl methacrylate and from 0.1% to 30%, advantageously from 0.2% to 20%, preferentially from 0.2% to 10% and more preferentially from 0.3% to 10% by weight of at least one comonomer containing at least one ethylenic unsaturation that can copolymerize with methyl methacrylate. Preferably, the or each comonomer is chosen from methyl acrylate and ethyl acrylate.

In an advantageous variant, the (meth)acrylic polymer P1 is a copolymer of methyl methacrylate and of alkyl acrylate.

In a preferred variant, the (meth)acrylic polymer P1 is a copolymer of methyl methacrylate and of methyl acrylate.

The weight-average molecular weight, noted as MW, of the or each (meth)acrylic polymer P1 is generally high and may consequently be greater than 40 000 g/mol, advantageously greater than 50 000 g/mol and preferentially greater than 60 000 g/mol. The weight-average molecular weight may be measured by size exclusion chromatography (SEC).

The or each (meth)acrylic polymer P1 advantageously has a melt mass-flow rate (MFR) ISO 1133-2:2011 (230° C./3.8 kg) of between 0.1 g/10 min and 20 g/10 min. Preferably, the melt mass-flow rate is between 0.2 g/10 min and 18 g/10 min, advantageously between 0.3 g/10 min and 16 g/10 min and preferably between 0.4 g/10 min and 13 g/10 min.

The liquid (meth)acrylic syrup of the (meth)acrylic composition according to the invention may comprise only one (meth)acrylic monomer M1, but may equally comprise a mixture of two, three or even more (meth)acrylic monomers M1.

Whether the liquid (meth)acrylic syrup comprises one or more (meth)acrylic monomers M1, the or each (meth)acrylic monomer M1 comprises only one (meth)acrylic function per monomer.

The or each (meth)acrylic monomer M1 may be chosen in particular from acrylic monomers and methacrylic monomers, notably from the methacrylates and acrylates mentioned in paragraph [0032] of US 2006/0251906 A1, referenced as [4].

Advantageously, the or each (meth)acrylic monomer M1 is chosen from acrylic acid, methacrylic acid, alkyl acrylic monomers and alkyl methacrylic monomers, the alkyl group of these (meth)acrylic monomers possibly being linear, branched or cyclic and containing from 1 to 22 carbon atoms, advantageously from 1 to 12 and preferentially from 1 to 6 carbon atoms.

Preferably, the or each (meth)acrylic monomer M1 is chosen from acrylic acid, methacrylic acid, methyl methacrylate, ethyl methacrylate, methyl acrylate, ethyl acrylate, n-butyl acrylate, isobutyl acrylate, cyclohexyl acrylate, cyclohexyl methacrylate, isobornyl acrylate, isobornyl methacrylate, heptyl methacrylate, n-octyl acrylate, 2-octyl acrylate, isooctyl acrylate, 2-ethylhexyl methacrylate, butyldiglycol methacrylate, dicyclopentenyloxyethyl methacrylate, ethoxyethyl methacrylate, isobutyl methacrylate, n-butyl methacrylate, tert-butyl methacrylate and hydroxypropyl methacrylate.

In an advantageous variant, the (meth)acrylic monomer M1 is methyl methacrylate.

Thus, when the (meth)acrylic syrup comprises a (meth)acrylic monomer M1, this monomer M1 is methyl methacrylate. When the (meth)acrylic syrup comprises two or more than two (meth)acrylic monomers M1, methyl methacrylate is, among the (meth)acrylic monomers M1, the (meth)acrylic monomer M1 which is in the major weight proportion.

According to one embodiment of the invention, methyl methacrylate represents at least 50% by weight, advantageously at least 60% by weight, more advantageously at least 70% by weight, preferentially at least 80% by weight and more preferentially at least 90% by weight of the (meth)acrylic monomers M1.

In a first variant of the invention, the liquid (meth)acrylic syrup comprises:

(a₁) from 15% by weight to 40% by weight and preferentially from 18% by weight to 30% by weight of the (meth)acrylic polymer(s) P1, and (a₂) from 60% by weight to 85% by weight and preferentially from 70% by weight to 82% by weight of the (meth)acrylic monomer(s) M1.

In a second variant of the invention, the liquid (meth)acrylic syrup comprises:

(a₁) from 13% by weight to 40% by weight and preferentially from 14% by weight to 40% by weight and more preferentially from 15% by weight to 40% by weight and even more preferentially from 18% by weight to 30% by weight of the (meth)acrylic polymer(s) P1, and (a₂) from 60% by weight to 87% by weight and preferentially from 60% by weight to 86% by weight and more preferentially from 60% by weight to 85% by weight and even more preferentially from 70% by weight to 82% by weight of the (meth)acrylic monomer(s) M1.

In an advantageous variant, the or each (meth)acrylic polymer P1 and the or each (meth)acrylic monomer M1 of the liquid (meth)acrylic syrup comprise at least one same (meth)acrylic unit, such a variant making it possible to optimize the solubility of the (meth)acrylic polymer(s) P1 in the (meth)acrylic monomer(s) M1.

Preferentially, the or each (meth)acrylic polymer P1 is chosen from a copolymer of methyl methacrylate and of methyl acrylate and a copolymer of methyl methacrylate and of ethyl acrylate.

Preferentially, the (meth)acrylic monomer M1 is methyl methacrylate.

In an advantageous variant, the liquid (meth)acrylic syrup comprises a (meth)acrylic polymer P1, rather than a mixture of (meth)acrylic polymers P1.

In an advantageous variant, the liquid (meth)acrylic syrup comprises a (meth)acrylic monomer M1, rather than a mixture of (meth)acrylic monomers M1.

More preferentially, the liquid (meth)acrylic syrup of the (meth)acrylic composition according to the invention comprises:

(a₁) a copolymer of methyl methacrylate and of methyl acrylate or a copolymer of methyl methacrylate and of ethyl acrylate as (meth)acrylic polymer P1, and (a₂) methyl methacrylate as (meth)acrylic monomer M1.

In an advantageous variant, the liquid (meth)acrylic syrup according to the invention has a dynamic viscosity, at 25° C., of between 10 mPa·s and 10 000 mPa·s. In such a variant, the liquid (meth)acrylic syrup is not too reactive and has a working time after mixing ("pot life") of at least 5 minutes, preferably of at least 10 minutes, for its subsequent transformation, notably for its transfer for the purpose of transformation by injection molding.

In a more advantageous variant, the liquid (meth)acrylic syrup according to the invention has a dynamic viscosity, at 25° C., of between 20 mPa·s and 7000 mPa·s and preferably between 20 mPa·s and 5000 mPa·s.

The liquid (meth)acrylic syrup may also comprise oligomers with (meth)acrylate functionality and/or stabilizers.

The oligomers with (meth)acrylate functionality may notably be epoxy-(meth)acrylates, urethane-(meth)acrylates or polyester-(meth)acrylates.

These oligomers may be present, in the liquid (meth)acrylic syrup, in a proportion of not more than 5 parts by weight, advantageously not more than 3 parts by weight and preferentially not more than 1 part by weight, per 100 parts by weight of the (meth)acrylic polymer(s) P1 and of the (meth)acrylic monomer(s) P1.

Stabilizers, or reaction inhibitors, may also be present in the liquid (meth)acrylic syrup to prevent spontaneous polymerization of the (meth)acrylic monomer(s) M1.

These stabilizers may notably be chosen from hydroquinone (HQ), hydroquinone monomethyl ether (HQME), 2,6-di-tert-butyl-4-methylphenol (BHT), 2,6-di-tert-butyl-4-methoxyphenol (Topanol O) and 2,4-dimethyl-6-tert-butylphenol (Topanol A).

These stabilizers may be present, in the liquid (meth)acrylic syrup, in a proportion of not more than 5 parts by weight, advantageously not more than 4 parts by weight and preferentially in a proportion of between 0.3 and 3 parts by weight, per 100 parts by weight of the (meth)acrylic polymer(s) P1 and of the (meth)acrylic monomer(s) M1.

The (meth)acrylic composition according to the invention also comprises a mineral filler C.

The mineral filler C may notably comprise a filler C1 chosen from quartz, granite, marble, feldspar, clay, glass, ceramics, mica, graphite, silicates, carbonates, carbides, sulfates, silicates, hydroxides, metal oxides, metals and mixtures thereof.

According to a particular embodiment, the filler C1 is in powder form.

Such a powder may be formed, for example, from particles, of which at least 50% by number have a mean particle size, noted as $D_{50}$, of less than or equal to 50 μm, advantageously less than or equal to 20 μm and preferentially less than or equal to 5 μm.

When the filler C1 is chosen from sulfates, this or these sulfates may be chosen from alkali metal and alkaline-earth metal sulfates, preferably magnesium sulfate, calcium sulfate, strontium sulfate and barium sulfate.

When the filler C1 is chosen from metal oxides, this or these metal oxides may be chosen from alumina $Al_2O_3$, which may or may not be hydrated, barium oxide BaO, silica $SiO_2$, magnesium oxide MgO and calcium oxide CaO.

According to a preferred embodiment, the metal oxide is silica $SiO_2$. This silica may notably be a ground crystalline silica or an amorphous silica.

When the filler C1 is chosen from carbonates, this or these carbonates may be chosen from calcium carbonate (chalk), magnesium carbonate, sodium carbonate and potassium carbonate.

When the filler C1 is chosen from silicates, this or these silicates may be chosen from calcium silicate, sodium silicate, potassium silicate and magnesium silicate.

In one variant of the invention, the mineral filler C may also further comprise aluminum trihydrate $Al(OH)_3$, noted as C2, and/or reinforcers, noted as C3.

The presence of aluminum trihydrate C2 makes it possible in particular to improve the machining of the composite material obtained from the (meth)acrylic composition according to the invention and also the fire resistance properties of this material.

According to a particular embodiment, the aluminum trihydrate C2 is in the form of particles, of which at least 50% by number have a mean particle size, noted as $D_{50}$, of less than or equal to 50 μm, advantageously less than or equal to 20 μm and preferentially less than or equal to 5 μm.

The reinforcers C3 may notably be in the form of fibers or beads. These fibers may be natural or synthetic, and short or long.

In an advantageous variant of the invention, the reinforcers C3 may be chosen from glass fabrics, glass fibers and glass beads.

The (meth)acrylic composition according to the invention comprises from 20 parts by weight to 300 parts by weight of mineral filler C.

According to a particular embodiment, the (meth)acrylic composition according to the invention comprises from 50 parts by weight to 250 parts by weight, advantageously from 100 parts by weight to 200 parts by weight, preferentially from 120 parts by weight to 180 parts by weight, more preferentially from 120 parts by weight to 170 parts by weight and even more preferentially from 140 parts by weight to 170 parts by weight of mineral filler C.

The (meth)acrylic composition according to the invention also comprises a (meth)acrylic monomer M2, a (meth)acrylic monomer M3 and a polymerization initiator.

The (meth)acrylic monomer M2, which can polymerize with the (meth)acrylic monomer(s) M1, is a compound which comprises at least two (meth)acrylic functions per monomer.

When it comprises two (meth)acrylic functions per monomer, this (meth)acrylic monomer M2 may be chosen from the dimethacrylates and diacrylates mentioned in paragraph [0033] of document [4].

When it comprises three (meth)acrylic functions per monomer, this (meth)acrylic monomer M2 may be chosen from the trimethacrylates and triacrylates mentioned in paragraph [0034] of document [4].

When it comprises four or more than four (meth)acrylic functions per monomer, this (meth)acrylic monomer M2 may be chosen from the tetraacrylates and pentaacrylates mentioned in paragraph [0035] of document [4].

In an advantageous variant of the invention, the (meth)acrylic monomer M2 is chosen from ethylene glycol dimethacrylate, neopentyl glycol dimethacrylate, neopentyl glycol diacrylate, 1,4-butanediol dimethacrylate, 1,4-butanediol diacrylate, 1,3-butylene glycol dimethacrylate, 1,3-butylene glycol diacrylate, triethylene glycol dimethacrylate and triethylene glycol diacrylate.

The (meth)acrylic composition according to the invention comprises from 0.01 part by weight to 5 parts by weight of (meth)acrylic monomer M2.

According to a particular embodiment, the (meth)acrylic composition according to the invention comprises from 0.1 part by weight to 4 parts by weight, advantageously from 0.5 part by weight to 3 parts by weight, more advantageously from 0.5 part by weight to 2.7 parts by weight, even more advantageously from 0.5 part by weight to 2.5 parts by weight and even more advantageously from 0.5 part by weight to 2.2 parts by weight of (meth)acrylic monomer M2.

The (meth)acrylic composition according to the invention also comprises a (meth)acrylic monomer M3, this (meth)acrylic monomer M3 being different from the (meth)acrylic monomer(s) M1 and from the (meth)acrylic monomer M2 which are present in the (meth)acrylic composition.

According to a first variant, this (meth)acrylic monomer M3, then noted as $M3_1$, is a (meth)acrylic monomer which comprises only one (meth)acrylic function per monomer. The (meth)acrylic monomer $M3_1$ may notably be chosen from the methacrylates and acrylates that have been mentioned above for the (meth)acrylic monomer(s) M1, on condition that the (meth)acrylic monomer $M3_1$ is a (meth)acrylic monomer that is different from the (meth)acrylic monomer(s) M1 present in the liquid (meth)acrylic syrup according to the invention.

Advantageously, the (meth)acrylic monomer $M3_1$ is chosen from alkyl (meth)acrylic monomers in which the alkyl group comprises at least 6 carbon atoms, this alkyl group possibly being linear, branched or cyclic, but preferentially being branched or cyclic.

Preferably, the (meth)acrylic monomer $M3_1$ is chosen from cyclohexyl acrylate, cyclohexyl methacrylate, isobornyl acrylate, isobornyl methacrylate, tert-butylcyclohexyl acrylate, 4-(1,1-dimethylethyl)cyclohexyl acrylate and 3,3,5-trimethylcyclohexyl acrylate.

According to a second variant, this (meth)acrylic monomer M3, then noted as $M3_2$, is a (meth)acrylic monomer which comprises at least two (meth)acrylic functions per monomer. The (meth)acrylic monomer $M3_2$ may notably be chosen from the dimethacrylates and diacrylates that have been mentioned above for the (meth)acrylic monomer M2, on condition that the (meth)acrylic monomer $M3_2$ is a (meth)acrylic monomer that is different from the (meth)acrylic monomer M2 present in the liquid (meth)acrylic syrup according to the invention.

Advantageously, the (meth)acrylic monomer $M3_2$ is chosen from the (meth)acrylic monomers that have been mentioned for the (meth)acrylic monomer M2 and notably those mentioned in paragraphs [0033] to [0035] of document [4].

Preferably, the (meth)acrylic monomer $M3_2$ is chosen from triethylene glycol dimethacrylate, neopentyl glycol dimethacrylate, neopentyl glycol diacrylate, 1,4-butanediol dimethacrylate, 1,4-butanediol diacrylate, 1,3-butylene glycol dimethacrylate, 1,3-butylene glycol diacrylate, triethylene glycol dimethacrylate and triethylene glycol diacrylate.

The (meth)acrylic composition according to the invention comprises from 0.01 part by weight to 10 parts by weight of (meth)acrylic monomer M3.

According to a particular embodiment, the (meth)acrylic composition according to the invention comprises from 0.1 part by weight to 5 parts by weight and advantageously 0.1 part by weight to 4 parts by weight of (meth)acrylic monomer M3.

According to another particular embodiment, the (meth)acrylic composition according to the invention comprises from 0.1 part by weight to 5 parts by weight of the sum of (meth)acrylic monomer M2 and of (meth)acrylic monomer M3.

The (meth)acrylic composition according to the invention also comprises a polymerization initiator, the function of which is to ensure the start of polymerization of the (meth)acrylic monomers M1, M2 and M3 ($M3_1$ or $M3_2$).

The polymerization initiator may be chosen from organic peroxides, peroxy esters, peroxy acetals and azo compounds.

To promote a subsequent transformation by injection of the (meth)acrylic composition according to the invention, the polymerization initiator is advantageously chosen from organic peroxides that are liquid at least in the temperature range extending from 0° C. to 50° C.

According to a particular embodiment, the polymerization initiator has a half-life temperature at 1 hour which is greater than 60° C., advantageously greater than 65° C. and preferably greater than 70° C.

According to a particular embodiment, the polymerization initiator has a maximum storage temperature of at least 10° C., advantageously of at least 15° C.

The polymerization initiator may in particular comprise from 2 to 30 carbon atoms and may be chosen, for example, from tert-amyl peroxyneodecanoate, di(sec-butyl) peroxydicarbonate, diisopropyl peroxydicarbonate, tert-butyl peroxyneodecanoate, bis(2-ethylhexyl) peroxydicarbonate, tert-amyl peroxypivalate, tert-butyl peroxypivalate, bis(3,5,5-trimethylhexanoyl) peroxide, 2,5-dimethyl-2,5-bis(2-ethylhexanoylperoxy)hexane, 1,1,3,3-tetramethylbutyl peroxy-2-ethylhexanoate, tert-amyl peroxy-2-ethylhexanoate, tert-butyl peroxy-2-ethylhexanoate, tert-butyl peroxydiethylacetate, tert-butyl peroxyisobutyrate, tert-amylperoxy-1-methoxycyclohexane, 1,1-di(tert-amylperoxy) cyclohexane, 1,1-di(tert-butylperoxy)-3,3,5-trimethylcyclohexane, 1,1-di(tert-butylperoxy)cyclohexane, tert-amyl peroxy-2-ethylhexylcarbonate, tert-butyl peroxy-2-ethylhexylcarbonate, tert-amyl peroxy-3,5,5-trimethylhexanoate, tert-butyl peroxy-3,5,5-trimethylhexanoate, tert-amyl peroxyacetate, tert-butyl peroxyacetate, 2,2-di(tert-butylperoxy)butane, 2,2-di(tert-amylperoxy)butane, tert-amyl peroxybenzoate, tert-butyl peroxybenzoate, butyl 4,4-di(tert-butylperoxy)valerate, 2,5-dimethyl-2,5-di(tert-butylperoxy) hexane, tert-butylcumyl peroxide, di-tert-amyl peroxide, di-tert-butyl peroxide, 1,1,3,3-tetramethylbutyl hydroperoxide, 3,5-diisopropylbenzene hydroperoxide, cumene hydroperoxide and mixtures thereof.

In an advantageous variant, the polymerization initiator is chosen from 2,5-dimethyl-2,5-bis(2-ethylhexanoylperoxy) hexane, 1,1,3,3-tetramethylbutylperoxy-2-ethylhexanoate, tert-amyl peroxy-2-ethylhexanoate, tert-butyl peroxy-2-ethylhexanoate, tert-butyl peroxydiethylacetate, tert-butyl peroxyisobutyrate, tert-amylperoxy-1-methoxycyclohexane, 1,1-di(tert-amylperoxy)cyclohexane, 1,1-di(tert-butylperoxy)-3,3,5-trimethylcyclohexane, 1,1-di(tert-butylperoxy) cyclohexane, tert-amyl peroxy-2-ethylhexylcarbonate, tert-butyl peroxy-2-ethylhexylcarbonate, tert-amyl peroxy-3,5,5-trimethylhexanoate, tert-butyl peroxy-3,5,5-trimethylhexanoate, tert-amyl peroxyacetate, tert-butyl peroxyacetate, 2,2-di(tert-butylperoxy)butane, 2,2-di(tert-amylperoxy)butane, tert-amyl peroxybenzoate, tert-butyl peroxybenzoate, butyl 4,4-di(tert-butylperoxy)valerate, 2,5-dimethyl-2,5-di(tert-butylperoxy)hexane, tert-butylcumyl peroxide, di-tert-amyl peroxide, di-tert-butyl peroxide, 1,1,3,3-tetramethylbutyl hydroperoxide, 3,5-diisopropylbenzene hydroperoxide and cumene hydroperoxide.

In a preferential variant, the polymerization initiator is chosen from 2,5-dimethyl-2,5-bis(2-ethylhexanoylperoxy) hexane, 1,1,3,3-tetramethylbutyl peroxy-2-ethylhexanoate, tert-butyl peroxy-2-ethylhexanoate, tert-butyl peroxydiethylacetate, tert-amylperoxy-1-methoxycyclohexane, 1,1-di(tert-amylperoxy)cyclohexane, 1,1-di(tert-butylperoxy)-3,3,5-trimethylcyclohexane, 1,1-di(tert-butylperoxy) cyclohexane, tert-amyl peroxy-2-ethylhexylcarbonate, tert-butyl peroxy-2-ethylhexylcarbonate, tert-amyl peroxy-3,5,5-trimethylhexanoate, tert-butyl peroxy-3,5,5-trimethylhexanoate, tert-amyl peroxyacetate, tert-butyl peroxyacetate, 2,2-di(tert-butylperoxy)butane, 2,2-di(tert-amylperoxy)butane, tert-amyl peroxybenzoate, tert-butyl peroxybenzoate, butyl 4,4-di(tert-butylperoxy)valerate, 2,5-dimethyl-2,5-di(tert-butylperoxy)hexane, tert-butylcumyl peroxide, di-tert-amyl peroxide, di-tert-butyl peroxide, 1,1,3,3-tetramethylbutyl hydroperoxide and 3,5-diisopropylbenzene hydroperoxide.

The (meth)acrylic composition according to the invention comprises from 0.01 part by weight to 5 parts by weight of polymerization initiator.

According to a particular embodiment, the (meth)acrylic composition according to the invention comprises from 0.02 part by weight to 4 parts by weight and advantageously 0.03 part by weight to 3 parts by weight of polymerization initiator per 100 parts by weight of the (meth)acrylic monomer(s) M1.

That which has just been described for a polymerization initiator is entirely transposable to an initiator system, such a system consisting of a polymerization initiator and a polymerization activator.

The (meth)acrylic composition according to the invention may also effectively further comprise a polymerization activator.

This polymerization activator may notably be chosen from tertiary amines such as N,N-dimethyl-p-toluidine (DMPT) and N,N-dihydroxyethyl-p-toluidine (DHEPT), and transition metal catalysts that are soluble in organic solutions.

According to a particular embodiment, the (meth)acrylic composition according to the invention comprises from 0.01 part by weight to 1 part by weight, advantageously from 0.02 part by weight to 0.7 part by weight and preferably from 0.03 part by weight to 0.4 part by weight of polymerization activator per 100 parts by weight of the (meth)acrylic monomer(s) M1.

According to an advantageous variant, the (meth)acrylic composition according to the invention may also comprise a coupling agent which promotes the dispersion of the mineral filler C in the liquid (meth)acrylic syrup formed by the (meth)acrylic polymer(s) P1 and the (meth)acrylic monomer(s) M1.

This coupling agent may be formed by the mineral filler C and/or by a compound per se. The coupling agent may be formed by only one of the compounds that have just been mentioned or by a mixture of two or more of these compounds.

In the case where it is formed by the mineral filler C, this mineral filler C is then functionalized.

By way of example, use may be made of a silanized silica such as the product sold by the company Quarzwerke under the name Silbond®W 12 MST.

In the case where it is formed by a compound per se, this coupling agent may be a compound comprising functional groups such as an organosilane. This coupling agent may notably be chosen from aminosilanes, vinylsilanes, methacrylsilanes and mixtures thereof. Preferably, the coupling agent is chosen from methacrylsilanes.

The (meth)acrylic composition according to the invention may also further comprise one or more additives, for instance a chain-limiting agent, a chain-transfer agent (for example dimethyldioxirane), an agent for adjusting the rate of polymerization of the (meth)acrylic monomer(s) M1, a flame retardant, a colorant and a pigment.

The present invention relates, secondly, to a composite material.

According to the invention, this composite material is obtained by polymerization of a (meth)acrylic composition as defined above, i.e. a composition comprising:
  (a) 100 parts by weight of a liquid (meth)acrylic syrup comprising:
    ($a_1$) from 10% by weight to 50% by weight of one or more (meth)acrylic polymers P1, and
    ($a_2$) from 50% by weight to 90% by weight of one or more (meth)acrylic monomers M1, each monomer M1 comprising only one (meth)acrylic function per monomer,
  (b) from 20 parts by weight to 300 parts by weight of a mineral filler C,
  (c) from 0.01 part by weight to 5 parts by weight of a (meth)acrylic monomer M2, the monomer M2 comprising at least two (meth)acrylic functions per monomer, (d) from 0.01 part by weight to 10 parts by weight of a (meth)acrylic monomer M3, the monomer M3 being: either a (meth)acrylic monomer $M3_1$ comprising only one (meth)acrylic function per monomer, the monomer $M3_1$ being different from the monomer(s) M1, or a (meth)acrylic monomer $M3_2$ comprising at least two (meth)acrylic functions per monomer, the monomer $M3_2$ being different from the monomer M2, (e) from 0.01 part by weight to 5 parts by weight of a polymerization initiator, and (f) optionally, a coupling agent.

The characteristics described above in connection with the (meth)acrylic composition, notably those relating to the (meth)acrylic polymer(s) P1 and the (meth)acrylic monomer(s) M1 forming the (meth)acrylic syrup, the (meth)acrylic monomers M2 and M3, the mineral filler C, the polymerization initiator and, where appropriate, the polymerization activator, the coupling agent and/or the additives, may be taken alone or in combination.

The composite material according to the invention is characterized by particularly efficient mechanical properties.

The present invention relates, thirdly, to a coated composite material, this coated composite material comprising a composite material and at least one protective layer placed on said composite material.

According to the invention, the material is as defined above, i.e. it is obtained by polymerization of a (meth)acrylic composition in accordance with what has just been described, notably as regards the features relating to the (meth)acrylic composition, the advantageous features of this (meth)acrylic composition being able to be taken alone or in combination.

The coated composite material according to the invention is characterized not only by the noteworthy mechanical properties imparted thereto by the composite material according to the invention, but also by the additional properties imparted thereto by the protective layer placed on the composite material. Such a protective layer may notably make it possible to impart and/or reinforce thermal insulation, electrical insulation, protection against UV rays, flame-retardant properties, and gas-barrier and/or water-barrier properties.

In an advantageous variant of the invention, the protective layer is obtained from a composition which has good compatibility with the (meth)acrylic composition from which the composite material is obtained.

This protective layer may notably be obtained from a composition comprising a fluorocarbon polymer, such as polyvinylidene fluoride (PVDF) or a (meth)acrylic polymer, preferably a (meth)acrylic polymer.

This composition of the protective layer may also comprise a mineral filler or, on the contrary and preferentially, may be free of such a filler.

The present invention relates, fourthly, to a process for manufacturing a composite material from a (meth)acrylic composition.

According to the invention, this process comprises:

(1) mixing of the compounds of a (meth)acrylic composition as defined above, the liquid (meth)acrylic syrup being prepared first and the polymerization initiator being introduced last into the liquid (meth)acrylic syrup, and (2) hot molding of the composition obtained on conclusion of step (1).

In other words, the process according to the invention comprises:

(1) mixing of the following compounds:

(a) 100 parts by weight of a liquid (meth)acrylic syrup comprising:
($a_1$) from 10% by weight to 50% by weight of one or more (meth)acrylic polymers P1, and
($a_2$) from 50% by weight to 90% by weight of one or more (meth)acrylic monomers M1, each monomer M1 comprising only one (meth)acrylic function per monomer, (b) from 20 parts by weight to 300 parts by weight of a mineral filler C, (c) from 0.01 part by weight to 5 parts by weight of a (meth)acrylic monomer M2, the monomer M2 comprising at least two (meth)acrylic functions per monomer, (d) from 0.01 part by weight to 10 parts by weight of a (meth)acrylic monomer M3, the monomer M3 being:
either a (meth)acrylic monomer $M3_1$ comprising only one (meth)acrylic function per monomer, the monomer $M3_1$ being different from the monomer(s) M1,
or a (meth)acrylic monomer $M3_2$ comprising at least two (meth)acrylic functions per monomer, the monomer $M3_2$ being different from the monomer M2, (e) from 0.01 part by weight to 5 parts by weight of a polymerization initiator, and (f) optionally, a coupling agent, the liquid (meth)acrylic syrup being prepared first and the polymerization initiator being introduced last into the liquid (meth)acrylic syrup, and (2) hot molding of the composition obtained on conclusion of step (1).

The manufacturing process according to the invention is thus a process that is particularly simple to perform and which may be readily performed in the current facilities dedicated to the manufacture of thermoplastic materials.

The features described previously in connection with the (meth)acrylic composition are, needless to say, applicable to the present process for manufacturing the material.

Step (1) of preparing the manufacturing process according to the invention is performed by mixing all of the compounds included in the (meth)acrylic composition, care being taken to prepare, firstly, the liquid (meth)acrylic syrup and then to introduce, into this (meth)acrylic syrup, the (meth)acrylic monomers M2 and M3 and, where appropriate, the polymerization activator, the coupling agent and/or the additives, and also the mineral filler C, the polymerization initiator being introduced last.

This mixing may be manual or may be performed using a mixer.

In an advantageous variant, the mixing is performed under a gentle vacuum so as to remove the reaction gases, typically between 80 mbar and 1 bar, advantageously between 100 mbar and 1 bar, more advantageously between 500 mbar and 900 mbar, and for a time of between 5 minutes and 6 hours, advantageously between 5 minutes and 2 hours, more advantageously between 15 minutes and 1 hour and preferentially between 30 minutes and 1 hour.

In an advantageous variant, after the degassing step that has just been described, a step of flushing the mixture with an inert gas, for example nitrogen, is performed.

In the case where the coupling agent is formed by the mineral filler C, the functionalization is performed prior to introducing it into the (meth)acrylic composition.

Step (2) of hot molding of the composition as obtained on conclusion of step (1) makes it possible to polymerize the thermoplastic matrix and, in so doing, to obtain the composite material according to the invention.

This hot molding step (2) may be performed via any molding technique conventionally used in the field of thermoplastics.

Particularly advantageously, this hot molding step (2) may be performed at a temperature of less than or equal to 80° C.

The hot molding step (2) may notably be performed by injection molding, by die molding (or die casting), by vacuum molding (or vacuum casting) or by low-pressure molding (or low-pressure casting).

In an advantageous variant, the injection molding is performed by means of the automatic pressure gelation process (abbreviated as APG).

To be compatible with an injection molding step (2) performed by means of the APG process, the polymerization initiator is in a liquid form within the temperature range extending from 0° C. to, for example, 50° C. and may be chosen more particularly from the organic peroxides mentioned previously for the (meth)acrylic composition, in the advantageous and preferential variants thereof.

The invention relates, fifthly, to the uses of the (meth)acrylic composition, of the composite material and of the coated composite material as defined above, the advantageous features of this (meth)acrylic composition and of these composite materials being able to be taken alone or in combination.

The (meth)acrylic composition according to the invention may be used for the manufacture of composite parts with a thermoplastic matrix.

The (meth)acrylic composition and the composite materials according to the invention may be used in many sectors and notably in the housing, motor vehicle, railway, sports, aeronautical industry, aerospace, photovoltaic or wind power sector, and in marine applications and medical applications.

By way of example, in the housing sector, these materials may be used for making bathroom and/or kitchen equipment, such as countertops, kitchen sinks, bathroom sinks, shower trays, baths or fascia panels.

Other features and advantages of the invention will emerge more clearly on reading the remainder of the description that follows, which relates to examples of preparation of (meth)acrylic compositions and composite materials and also to the evaluation of the mechanical properties of these materials.

DETAILED DESCRIPTION OF PARTICULAR EMBODIMENTS

1. Preparation of the Composite Materials
1.1. Compounds Used

The compounds used for the preparation of the various (meth)acrylic compositions are the following:
- as (meth)acrylic polymer P1: a PMMA formed by a copolymer of methyl methacrylate and of ethyl acrylate, sold by the company Altuglas under the name Altuglas® BS 520,
- as (meth)acrylic monomer M1: a methyl methacrylate stabilized with hydroquinone monomethyl ether,
- as mineral filler C: a silica,
- as (meth)acrylic monomer M2:
  - an ethylene glycol dimethacrylate (EGDMA) sold by the company Sartomer under the name SR 206, or
  - a 1,4-butanediol dimethacrylate (BDDMA)
- as (meth)acrylic monomer M3:
  - a 4-tert-butylcyclohexyl acrylate (tBCHA),
  - an isobornyl acrylate (IBA), or
  - a triethylene glycol dimethacrylate (TEGDMA),
- as polymerization initiator: a 3,5-diisopropylbenzene hydroperoxide sold by the company Arkema under the name Luperox® DH,
- as coupling agent:
  - BYK-C 8000 sold by the company BYK, or
  - Geniosil®GF 31 sold by the company Wacker, and
- as activator: a vanadium dibutyl phosphate comprising 5% by mass of vanadium in propylene glycol, sold by the company OMG Borchers under the name Borchers® VP 0132.

1.2. Preparation of the Liquid (Meth)Acrylic Syrup

The liquid (meth)acrylic syrup which will be used for the preparation of the various (meth)acrylic compositions is prepared by dissolving 20 parts by weight of the (meth)acrylic polymer P1 in 80 parts by weight of the (meth)acrylic monomer M1.

1.3. Preparation of the (Meth)Acrylic Compositions

To the 100 parts by weight of the liquid (meth)acrylic syrup obtained in section 1.2. above are added 0.2 part by weight of the activator (Borchers® VP 0132) and the other following compounds, in the weight contents specified in Table 1 below, followed by 163.2 parts by weight of silica and, finally, 2 parts by weight of the polymerization initiator (Luperox® DH), to obtain various methacrylic compositions 1 to 3 according to the invention and the comparative composition 4:

TABLE 1

| Methacrylic composition | 1 (according to the invention) | 2 (according to the invention) | 3 (according to the invention) | 4 (comparative) |
|---|---|---|---|---|
| M1 + P1 | 100 | 100 | 100 | 100 |
| Silica | 163.2 | 163.2 | 163.2 | 163.2 |
| EGDMA (M2) | 1 | 1 | — | — |
| BDDMA (M2) | — | — | 1 | — |
| tBCHA (M3$_1$) | 1 | — | — | — |
| IBA (M3$_1$) | — | 1 | — | — |
| TEGDMA (M3$_2$) | — | — | 1 | — |
| BYK-C 8000 | 0.3 | — | 0.3 | — |
| Geniosil ®GF 31 | — | 1 | — | — |
| Borchers ®VP 0132 | — | 0.2 | 0.2 | 0.2 |
| Luperox ®DH | 2 | 2 | 2 | 2 |

The compounds forming the methacrylic compositions 1 to 3 according to the invention and the comparative composition 4 are mixed for a time ranging between 10 minutes and 5 hours.

After degassing under a vacuum of 900 mbar for 60 minutes, each of the compositions 1 to 4 is flushed with nitrogen and then injected into a mold having an imprint that is compatible with the production of 1B type specimens in accordance with the standard ISO 527-1:2012.

1.4. Production of the Composite Materials

Polymerization of each of the compositions 1 to 4 is obtained by placing the mold at a temperature of 80° C. for 15 minutes.

2. Evaluation of the Mechanical Properties of the Composite Materials

The mechanical properties were determined by means of tensile tests performed at 23° C., at 60° C. and at 90° C., on the specimens as obtained in section 1.4. above, using each of the compositions 1 to 4.

The following were thus determined, in accordance with the standard ISO 527-1:2012:
- the limit tensile strength value or maximum force, in N,
- the elongation at break, in %,
- the elastic modulus, in MPa, and
- the breaking strength, in MPa.

The results of the tensile tests performed at 23° C. are given in Table 2 below:

TABLE 2

| Composition | 1 | 2 | 3 | 4 |
| --- | --- | --- | --- | --- |
| Maximum force (N) | 1965 | 2567 | 2514 | 1608 |
| Elongation at break (%) | 0.65 | 0.93 | 0.96 | 0.51 |
| Elastic modulus (MPa) | 10060 | 10509 | 9820 | 9623 |
| Breaking strength (MPa) | 51.1 | 63.7 | 65.5 | 44.0 |

The results given in Table 2 reveal the poor mechanical properties, at 23° C., of the specimens obtained using the comparative composition 4.

The results of the tensile tests performed at 60° C. are given in Table 3 below:

TABLE 3

| Composition | 1 | 2 | 3 | 4 |
| --- | --- | --- | --- | --- |
| Maximum force (N) | 1718 | 1898 | 1530 | — |
| Elongation at break (%) | 1.16 | 1.49 | 1.07 | — |
| Elastic modulus (MPa) | 8072 | 6967 | 5671 | — |
| Breaking strength (MPa) | 44.4 | 47.6 | 38.8 | — |

It is observed that at 60° C., evaluation of the mechanical properties of the specimens obtained using the comparative composition 4 could not be measured.

The results of the tensile tests performed at 90° C. are given in Table 4 below:

TABLE 4

| Composition | 1 | 2 | 3 | 4 |
| --- | --- | --- | --- | --- |
| Maximum force (N) | 677 | 613 | 554 | — |
| Elongation at break (%) | 2.84 | 6.52 | 9.14 | — |
| Elastic modulus (MPa) | 2639 | 2032 | 1878 | — |
| Breaking strength (MPa) | 17 | 16.0 | 14.4 | — |

It is observed that at 90° C. also, evaluation of the mechanical properties of the specimens obtained using the comparative composition 4 could not be measured.

BIBLIOGRAPHY

[1] WO 2013/056845 A1
[2] WO 2014/013028 A1
[3] WO 2014/135816 A1
[4] US 2006/0251906 A1

The invention claimed is:

1. A (meth)acrylic composition comprising:
   (a) 100 parts by weight of a liquid (meth)acrylic syrup comprising:
      ($a_1$) from 10% by weight to 50% by weight of one or more (meth)acrylic polymers P1, and
      ($a_2$) from 50% by weight to 90% by weight of one or more (meth)acrylic monomers M1, each monomer M1 comprising only one (meth)acrylic function per monomer,
   (b) from 20 parts by weight to 300 parts by weight of a mineral filler C,
   (c) from 0.01 part by weight to 5 parts by weight of a (meth)acrylic monomer M2, the monomer M2 comprising at least two (meth)acrylic functions per monomer,
   (d) from 0.01 part by weight to 10 parts by weight of a (meth)acrylic monomer M3, the monomer M3 being: either a (meth)acrylic monomer $M3_1$ comprising only one (meth)acrylic function per monomer, the monomer(s) $M3_1$ being different from the monomer(s) M1, or a (meth)acrylic monomer $M3_2$ comprising at least two (meth)acrylic functions per monomer, the monomer $M3_2$ being different from the monomer M2,
   (e) from 0.01 part by weight to 5 parts by weight of a polymerization initiator, and
   (f) optionally, a coupling agent.

2. The (meth)acrylic composition as claimed in claim 1, wherein each (meth)acrylic polymer P1 is chosen from a methyl methacrylate homopolymer and a methyl methacrylate copolymer, methyl methacrylate representing at least 50% by weight of each (meth)acrylic polymer P1.

3. The (meth)acrylic composition as claimed in claim 2, wherein each (meth)acrylic polymer P1 is a copolymer of methyl methacrylate and of one or more alkyl acrylate in which the alkyl group contains from 1 to 12 carbon atoms.

4. The (meth)acrylic composition as claimed in claim 1, wherein each (meth)acrylic monomer M1 is chosen from acrylic acid, methacrylic acid, alkyl acrylic monomers and alkyl methacrylic monomers, the alkyl group of these (meth)acrylic monomers being linear, branched or cyclic and containing from 1 to 22 carbon atoms.

5. The (meth)acrylic composition as claimed in claim 4, wherein methyl methacrylate represents at least 50% by weight of the (meth)acrylic monomer(s) M1.

6. The (meth)acrylic composition as claimed in claim 1, wherein the liquid (meth)acrylic syrup comprises:
   ($a_1$) from 15% by weight to 40% by weight of the (meth)acrylic polymer(s) P1, and
   ($a_2$) from 60% by weight to 85% by weight of the (meth)acrylic monomer(s) M1.

7. The (meth)acrylic composition as claimed in claim 1, wherein the liquid (meth)acrylic syrup has a dynamic viscosity, at 25° C., of between 10 mPa·s and 10,000 mPa·s.

8. The (meth)acrylic composition as claimed in claim 1, wherein the liquid (meth)acrylic syrup has a working time after mixing of at least 5 minutes.

9. The (meth)acrylic composition as claimed in claim 1, wherein the mineral filler C comprises one or more filers selected from the group consisting of quartz, granite, marble, feldspar, clay, glass, ceramics, mica, graphite, silicates, carbides, sulfates, silicates, hydroxides, oxides, metals, sulfates, alkali metal sulfates, alkaline-earth metal sulfates, magnesium sulfate, calcium sulfate, strontium sulfate, barium sulfate, metal oxides, alumina $Al_2O_3$ which may or may not be hydrated, barium oxide (BaO), silica (SiO$_2$), magnesium oxide (MgO), calcium oxide (CaO), carbonates, calcium carbonate (chalk), magnesium carbonate, sodium carbonate, potassium carbonate, calcium silicate, sodium silicate, potassium silicate, and magnesium silicate.

10. The (meth)acrylic composition as claimed in claim 1, wherein the filler C further comprises aluminum trihydrate Al(OH)$_3$, noted as C2, and/or reinforcers, noted as C3.

11. The (meth)acrylic composition as claimed in claim 1, wherein the (meth)acrylic composition comprises from 0.5 part by weight to 2.2 parts by weight of (meth)acrylic monomer M2.

12. The (meth)acrylic composition as claimed in claim 1, wherein the (meth)acrylic monomer M2 is selected from the group consisting of ethylene glycol dimethacrylate, neopentyl glycol dimethacrylate, neopentyl glycol diacrylate, 1,4-butanediol dimethacrylate, 1,4-butanediol diacrylate, 1,3-butylene glycol dimethacrylate, 1,3-butylene glycol diacrylate, triethylene glycol dimethacrylate and triethylene glycol diacrylate.

13. The (meth)acrylic composition as claimed in claim 1, wherein the (meth)acrylic monomer M3$_1$ is selected from the group consisting of cyclohexyl acrylate, cyclohexyl methacrylate, isobornyl acrylate, isobornyl methacrylate, tert-butylcyclohexyl acrylate, and 4-(1,1-dimethylethyl)cyclohexyl acrylate and 3,3,5-trimethylcyclohexylacrylate.

14. The (meth)acrylic composition as claimed in claim 1, wherein the (meth)acrylic monomer M3$_2$ is selected from the group consisting of ethylene glycol dimethacrylate, neopentyl glycol dimethacrylate, neopentyl glycol diacrylate, 1,4-butanediol dimethacrylate, 1,4-butanediol diacrylate, 1,3-butylene glycol dimethacrylate, 1,3-butylene glycol diacrylate, triethylene glycol dimethacrylate and triethylene glycol diacrylate.

15. The (meth)acrylic composition as claimed in claim 1, wherein the polymerization initiator is chosen from organic peroxides that are liquid in the temperature range from 0° C. to 50° C.

16. The (meth)acrylic composition as claimed in claim 1, wherein the (meth)acrylic composition further) comprises from 0.01 part by weight to 1 part by weight of polymerization activator per 100 parts by weight of the (meth)acrylic monomer(s) M1.

17. The (meth)acrylic composition as claimed in claim 1, further comprising a coupling agent, said coupling agent being formed by the mineral filler C which is functionalized or by a methacrylsilane.

18. A composite material obtained by polymerization of a (meth)acrylic composition as claimed in claim 1.

19. The composite material as claimed in claim 18, further comprising at least one protective layer placed on said composite material, said protective layer being obtained from a composition comprising a (meth)acrylic polymer.

20. A process for manufacturing a composite material as claimed in claim 18, said process comprising:
  (1) mixing of the compounds of a (meth)acrylic composition comprising:
    (a) 100 parts by weight of a liquid (meth)acrylic syrup comprising:
      (a$_1$) from 10% by weight to 50% by weight of one or more (meth)acrylic polymers P1, and
      (a$_2$) from 50% by weight to 90% by weight of one or more (meth)acrylic monomers M1, each monomer M1 comprising only one (meth)acrylic function per monomer,
    (b) from 20 parts by weight to 300 parts by weight of a mineral filler C,
    (c) from 0.01 part by weight to 5 parts by weight of a (meth)acrylic monomer M2, the monomer M2 comprising at least two (meth)acrylic functions per monomer,
    (d) from 0.01 part by weight to 10 parts by weight of a (meth)acrylic monomer M3, the monomer M3 being:
      either a (meth)acrylic monomer M3$_1$ comprising only one (meth)acrylic function per monomer, the monomer M3$_1$ being different from the monomer(s) M1,
      or a (meth)acrylic monomer M3$_2$ comprising at least two (meth)acrylic functions per monomer, the monomer M3$_2$ being different from the monomer M2,
    (e) from 0.01 part by weight to 5 parts by weight of a polymerization initiator, and
    (f) optionally, a coupling agent, the liquid (meth)acrylic syrup being prepared first and the polymerization initiator being introduced last into the liquid (meth)acrylic syrup, and
  (2) hot-molding of the (meth)acrylic composition obtained on conclusion of step (1), wherein the hot molding step (2) is performed by injection molding, die molding, vacuum molding or low-pressure molding.

21. The manufacturing process as claimed in claim 20, in which the mixing step (1) is performed under a gentle vacuum of between 100 mbar and 1 bar.

22. The (meth)acrylic composition as claimed in claim 1, wherein said composition forms a thermoplastic composite part, and wherein said thermoplastic composite part is part of an application selected from the group consisting of housing, motor vehicle, railway, sports, aeronautical industry, aerospace, photovoltaic, wind power sector, marine applications, and medical applications.

* * * * *